United States Patent
Garner et al.

(10) Patent No.: US 12,220,757 B2
(45) Date of Patent: Feb. 11, 2025

(54) DUAL HEAD pECM

(71) Applicant: Rolls-Royce Corporation, Indianapolis, IN (US)

(72) Inventors: Rusty M. Garner, Indianapolis, IN (US); Damon Ward, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 209 days.

(21) Appl. No.: 17/661,236

(22) Filed: Apr. 28, 2022

(65) Prior Publication Data

US 2023/0347429 A1    Nov. 2, 2023

(51) Int. Cl.
  *B23H 3/02*  (2006.01)
  *B23H 3/04*  (2006.01)
  *B23H 3/10*  (2006.01)
  *B23H 7/30*  (2006.01)

(52) U.S. Cl.
  CPC .......... *B23H 3/02* (2013.01); *B23H 3/04* (2013.01); *B23H 3/10* (2013.01); *B23H 7/30* (2013.01); *B23H 2300/10* (2013.01)

(58) Field of Classification Search
  CPC ... B23H 3/00; B23H 3/02; B23H 3/04; B23H 3/10; B23H 9/10; B23H 7/26; B23H 7/30; B23H 2300/10
  See application file for complete search history.

(56) References Cited

U.S. PATENT DOCUMENTS

| | | |
|---|---|---|
| 5,836,075 A | 11/1998 | Fitzgerald et al. |
| 7,204,926 B2 | 4/2007 | Lamphere et al. |
| 2006/0243601 A1 | 11/2006 | Bayer et al. |
| 2009/0008265 A1 | 1/2009 | Bayer et al. |
| 2012/0103830 A1 | 5/2012 | Platz et al. |
| 2014/0069809 A1 | 3/2014 | Laun et al. |
| 2016/0074952 A1 | 3/2016 | Huttner et al. |
| 2017/0066071 A1* | 3/2017 | Huttner ................ F01D 5/143 |

(Continued)

OTHER PUBLICATIONS

Emag, "The Cost-Effective Solution for Complex Turbine-Blade Machining with PECM Technology," Mar. 2022, 3 pgs., Retrieved from the Internet: https://www.emag.com/machines/ecm-pecm-machines/po-100-sf.html.

(Continued)

*Primary Examiner* — Brian W Cohen
(74) *Attorney, Agent, or Firm* — Shumaker & Sieffert, P.A.

(57) ABSTRACT

In some examples, a pulsed electrochemical machining (pECM) system including a first tool body including a first electrode defining a working surface at a distal end of the tool axis configured to face a workpiece and a second tool body including a second electrode defining a working surface at a distal end of the tool axis configured to face a workpiece. The system includes a mechanical system configured to position the working surface of the first tool body relative to the workpiece and configured to position the working surface of the second tool body relative to the workpiece. The system includes an electrolyte system configured to supply electrolyte to a first interelectrode gap and a second interelectrode gap and a power supply configured to generate a pulsed direct current between the first tool body and the workpiece and the second tool body and the workpiece.

15 Claims, 10 Drawing Sheets

(56) References Cited

U.S. PATENT DOCUMENTS

2018/0333795 A1* 11/2018 Schmidt .............. B23H 11/003

OTHER PUBLICATIONS

Extended Search Report from counterpart European Application No. 23168599.1 dated Oct. 5, 2023, 7 pp.
Response to Extended Search Report dated Oct. 5, 2023, from counterpart European Application No. 23168599.1 filed Apr. 22, 2024, 10 pp.

* cited by examiner

DUAL HEAD pECM

TECHNICAL FIELD

The disclosure relates to pulsed electrochemical machining (pECM).

BACKGROUND

Machining processes may involve removal of material from a workpiece to form a component having a finished shape and texture. Pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 10 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional methods. Materials commonly machined with pECM include, for example, nickel, iron, and titanium-based alloys in a variety of formats such as cast (including single crystal), forged, additively manufactured, and powdered metallurgy.

SUMMARY

In some examples, the disclosure describes a pulsed electrochemical machining system (pECM) including a pECM tool that includes a first tool body defining a first tool axis. The first tool body includes a first electrode defining a first working surface configured to face a workpiece. The pECM tool also includes a second tool body defining a second tool axis, and the second tool body includes a second electrode defining a second working surface configured to face the workpiece. The pECM system includes a mechanical system configured to position the first working surface of the first tool body relative to the workpiece and configured to position the second working surface of the second tool body relative to the workpiece. The pECM system further includes an electrolyte system configured to supply electrolyte to a first interelectrode gap between the first working surface of the first tool body and a first target surface of the workpiece, and a second interelectrode gap between the second working surface of the second tool body and a second target surface of the workpiece. The pECM system also includes a power supply configured to generate a pulsed direct current between the first tool body and the workpiece and the second tool body and the workpiece.

In some examples, the disclosure describes a pulsed electrochemical machining (pECM) method for machining a workpiece that includes delivering electrolyte through an electrolyte system into a first interelectrode gap between a first working surface and a first target surface of the workpiece. The method also includes delivering electrolyte through an electrolyte system into a second interelectrode gap between a second working surface and a second target surface of the workpiece. The first working surface is defined by a first electrode of a first tool body, and the second working surface is defined by a second electrode of a second tool body. The method also includes generating pulsed direct current between the first electrode and the workpiece, and between the second electrode and the workpiece.

The details of one or more examples are set forth in the accompanying drawings and the description below. Other features, objects, and advantages will be apparent from the description and drawings, and from the claims.

DETAILED DESCRIPTION

Figure 1A:
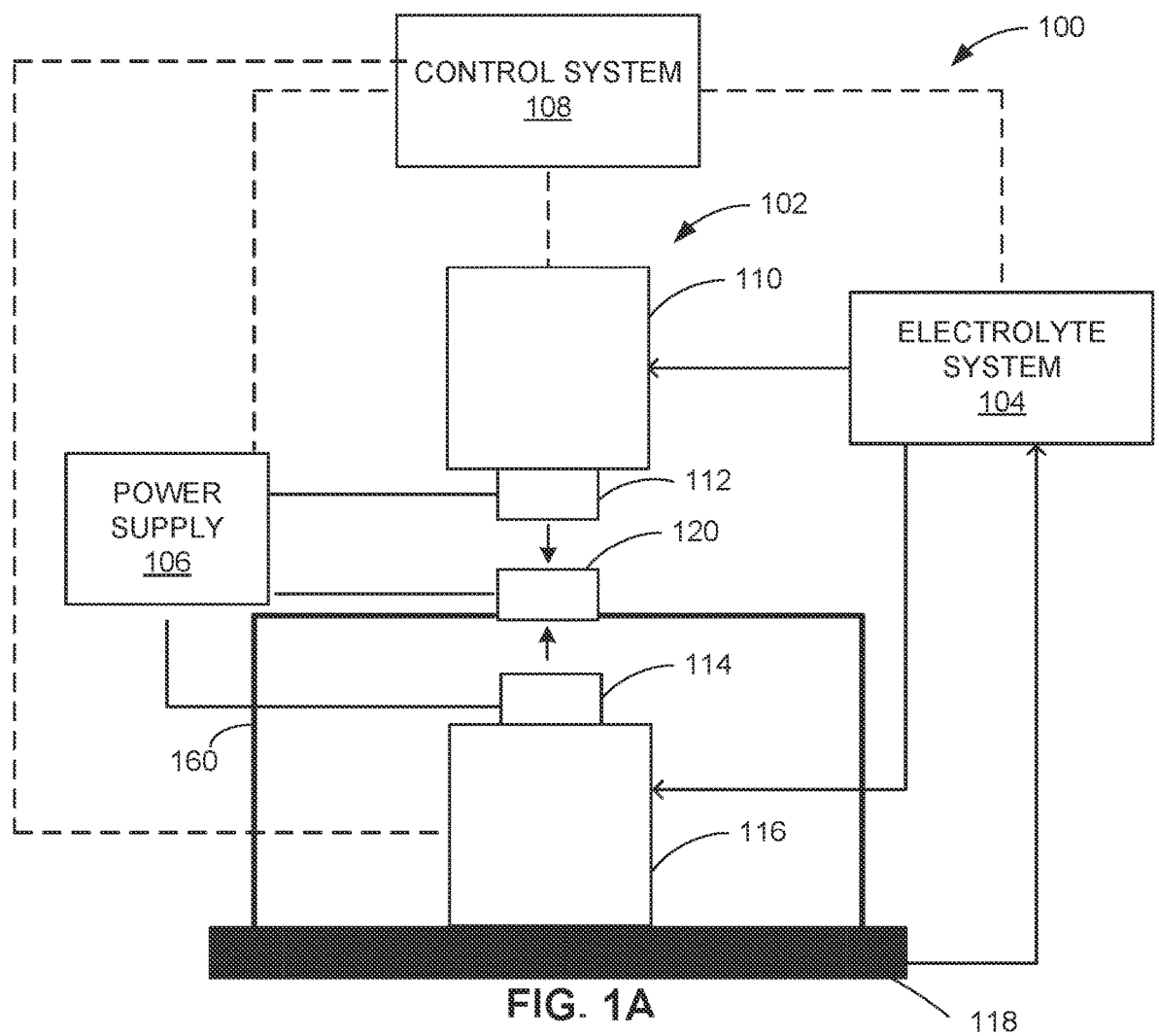
FIG. 1A is a conceptual block diagram illustrating a pulsed electrochemical machining (pECM) system.

The disclosure generally describes techniques and systems for pulsed electrochemical machining using more than one tool body (e.g., using dual tool body or "dual heads"). Stated similarly, the disclosure relates to techniques and systems for pulsed electrochemical machining using at least two tool bodies as electrodes (cathodes) to machine an anodic workpiece. The movement and/or other operation of the two tool bodies may be independent of each other during the pECM process (e.g., with the movement of a first one of the tool bodies being independently controllable by a control system relative to the movement of a second one of the tool bodies). In some examples, the movement and/or other operation of the two tool bodies may be coordinated with each other, e.g., to provide for the desired machining of a workpiece with the two tool bodies. For ease of description, examples of the disclosure are described primarily with regard to system and techniques that employ two tool bodies. However, examples of the disclosure may include examples in which more than two tool bodies are employed.

According to some examples of the disclosure, the two tool bodies may be configured to oscillate during pECM operations. In some examples, the respective movements of a first tool body and a second tool body may be synchronized or otherwise coordinated with each other such that the first and second tool bodies oscillate toward the workpiece at the same time and away from the workpiece at the same time.

The two tool bodies may be configured to machine the same or different (e.g., opposing) sides of a workpiece. In examples where the first tool body and the second tool body are on opposing sides of a workpiece, synchronized operation of the first tool body and the second tool body may maintain pressure of electrolyte in an interelectrode gap on each side of the workpiece approximately equal, e.g., such that forces on opposing sides of the workpiece substantially cancel each other out. Since pressure from oscillating tool bodies on opposite sides of a workpiece may cancel out, the pECM system may not require extensive fixturing, clamping, and/or workholding apparatus for holding the workpiece during the pECM process. Accordingly, since limited fixturing may be required, variation in the shape or size of different workpieces may be processed using the pECM machining system, relative to systems which use a single tool body because these single tool body systems may require more extensive fixturing to maintain the position of the workpiece under the pressure of the electrolyte during pECM operations. Accordingly, systems according to the present disclosure may be particularly useful in pECM machining of components such as airfoils, airfoil coversheets, airfoil spars, or the like, as will be discussed in further detail below.

In some examples, systems and techniques of the present disclosure may allow for substantially simultaneous machining of more than two surfaces of a workpiece using pECM. For example, example system and techniques of the disclosure may include the substantially simultaneous machining of opposing sides of a workpiece using pECM, which may improve throughput and efficiency of the pECM system.

In some examples, the first tool body and the second tool body may be synchronized such that at a time when the first tool body reaches the point at which the electrode is the closest to the corresponding target surface of the workpiece (i.e., the closest approach), the second tool body reaches its most distant point from the workpieces at substantially the same time. Used in this way, complexity of a dual head pECM system may be reduced because an actuation system may cause the first tool body and the second tool body to move in the same direction at the time (e.g., using a linear drive or drives). In this example, the first tool body may be machining while moving toward the first target surface of the workpiece, while the second tool body on the opposing side of the workpiece is trapping electrolyte between the workpiece and the second tool body, with the trapped electrolyte acting as a damper between the second target surface of the workpiece and the second tool body, and vice versa. The trapped electrolyte may assist in protecting the second target surface from damage during pECM operations.

FIG. 1A is a schematic conceptual block diagram illustrating an example pulsed electrochemical machining (pECM) system 100 for machining a workpiece 120. pECM system 100 includes a mechanical system 102, an electrolyte system 104, a power supply 106, and a control system 108. While illustrated as separate components, the various components of pECM system 100 may be integrated with other components (e.g., power supply 106 incorporated into mechanical system 102) or overlap with other components (e.g., controllers of mechanical system 102 overlapping with control system 108). While examples of the disclosure are described primarily with regard to pulsed electrochemical machining processes performed by pECM system 100, other examples of the disclosure may be employed using other machining techniques that employ electrochemical machining to shape or otherwise selectively remove material from a workpiece.

Mechanical system 102 may include a first actuation system 110, a second actuation system 116, a first machining tool 112, a second machining tool 114, and an enclosure system 118. Actuation system 110 may be configured to control a position of machining tool 112 relative to workpiece 120, and separate actuation system 116 may control a position of second machining tool 114 relative to workpiece 120. In some examples, actuation system 116 may be omitted and actuation system 110 may control a position of both first machining tool 112 and second machining tool 114 relative to workpiece 120. For brevity, operation of pECM system 100 will be described with respect to first actuation system 110 and first machining tool 112, but unless otherwise conflicting, the description applies to second actuation system 116 and second machining tool 114. In some examples, as illustrated, second machining tool 114 may be positioned on the opposite side of workpiece 120 from first machining tool 112.

During a pECM process, first actuation system 110 may adjust the position of first tool 112 relative to workpiece 120 as needed by moving first tool 112. First actuation system 110 may include one or more actuators, such as direct drive actuators, configured to move tool 112 as desired during a pECM process. For examples, one or more actuators may be configured to feed or otherwise move first machining tool 112 toward workpiece 120 during a pECM process. In some examples, first actuation system 110 may be configured to oscillate first machining tool 112 (e.g., along the z-axis shown in FIGS. 1B and 1C). Such movement of first tool 112 by first actuation system 110 may improve removal of dissolved material and restore a concentration of electrolyte between first machining tool 112 and workpiece 120. As illustrated in the example of FIG. 1A, mechanical system 102 may be configured to receive electrolyte from electrolyte system 104 and discharge the electrolyte to or proximate to first machining tool 112.

First machining tool 112 may be configured to mechanically couple to first actuation system 110 and electrically couple to power supply 106. For example, first machining tool 112 may include one or more structures or assemblies to couple to first actuation system 110, such that first machining tool 112 receives a control force for positioning first machining tool 112, electrolyte (if distributed via mechanical system 102) for discharging from first machining tool 112, and electrical current for generating an electric potential between first machining tool 112 and workpiece 120. As will be described further in FIGS. 1B and 1C below, first machining tool 112 may be configured to define a working surface that, in combination with workpiece 120 and the electrolyte supplied by electrolyte system 104, forms an electrolytic cell that dissolves material from the first target surface of workpiece 120 using electrolysis.

Enclosure and fixturing system 118 may be configured to mount workpiece 120 and electrically couple workpiece 120 to power supply 106 for generating a voltage between first machining tool 112 and workpiece 120 (e.g., in the form of a pulsed direct current) and second machining tool 114 and workpiece 120. For example, enclosure and fixturing system 118 may position a first surface of workpiece 120 toward first machining tool 112, and a second opposing surface of workpiece 120 toward second machining tool 114, such that working surfaces of workpiece 120 are exposed to working surfaces of machining tools 112 and 114. In some examples, enclosure and fixturing system 118 may capture spent electrolyte from workpiece 120 for return to electrolyte system 104. Enclosure and fixturing system 118 may include a plurality of mechanical supports 160, which maintain the position of workpiece 120 during pECM operations. Mechanical supports 160 may include a series of clamps or other workholding structures. In some examples, because the forces acting on workpiece 120 from first machining tool 112 and second machining tool 114 may act on workpiece 120 in approximately equal and opposite directions, pECM system 100 may require relatively few mechanical supports 160 compared to similar systems. Accordingly, pECM system 100 may allow space around workpiece 120 that is not filled with mechanical supports or other workholding structures, and thus accommodate workpieces 120 of varying dimensions. In some examples, as illustrated, mechanical supports 160 may engage workpiece 120 at two or fewer points of contact.

Additional benefits may be gained through pECM system 100 including enclosure and fixturing system 118, which may include mechanical supports 160. For example, mechanical supports 160 may allow for a reduction in complexity of the workholding fixtures. Additionally, mechanical supports 160, which may only minimally restrain workpiece 120 may allow workpiece 120 to more closely match the desired "free state condition" needed for installation at assembly. In some examples, utilizing opposing tools (or "heads") may allow for two or more sides of a workpiece to be machined at the same time. Such a system may allow for near net parts to be machined in an unconstrained state or minimally constrained state. Furthermore, in some examples, mechanical supports 160 may be robotically controlled arms including a simple gripper attachment grasping only a small area of workpiece 120 (e.g., one or two points of contact) to position, secure, and/or hold the work in the proper orientation during pECM operations. In some examples, electrolyte flow control and electrode fixturing may be combined to simplify the workholding requirements. In some examples, pECM system 100 including first machining tool 112 and second machining tool 114 system and enclosure and fixturing system may be arranged in a manner that encapsulates workpiece 120 to seal the fluid containment zones.

In some examples, a "clam shell" sealing assembly may be included as part of enclosure and fixturing system 118. In a clam shell sealing assembly, the perimeter of the shells making up the clam shell may mate and seal around the workpiece and gripper attachment. Simultaneously, the first machining tool 112 and/or second machining tool 114 may be sealed with the clam shell sealing assembly in a way that still allows them to travel towards workpiece 120 and/or oscillate as the pECM operation progresses. In some examples, enclosure and fixturing system 118 may aid in simplifying the overall complexity of the pECM operation and be more robust, adaptable, and production scalable.

Electrolyte system 104 may be configured to condition and circulate electrolyte (e.g., liquid electrolyte) for distribution to working surfaces of machining tools 112 and 114, such as via mechanical system 102. Electrolyte system 104 may include one or more pumps configured to discharge the electrolyte to mechanical system 104, one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte.

Power supply 106 may be configured to generate an electric potential between first machining tool 112 and workpiece 120, and second machining tool 114 and workpiece 120. For example, power supply 106 may be configured to apply a voltage between first machining tool 112 and workpiece 120 to generate current flow between machining tool 112 and workpiece 120 with the electrolyte flowing or otherwise present between machining tool 112 and workpiece 120. For a pECM process, power supply 106 may be configured to supply voltage in pulses, such as in combination with oscillations of machining tool 112 relative workpiece 120, to increase local current density. For example, power supply 106 may include a direct current (DC) source that applies a pulsed direct current to both first machining tool 112 and workpiece 120 during the pulse electrochemical machining process. In some examples, first actuation system 110 may oscillate the position of machining tool 112 relative workpiece 120 in coordination with the pulsed direct current. In some examples, the pulse of direct current increases the magnitude of electrification of first machining tool 112 (e.g., first electrode 168). In some examples, the pulse of direct current may involve increasing the magnitude of a current supplied to machining tool 112 and or second machining tool 114 (e.g., increasing the current from a baseline (non-zero) level of electrification). In some examples, the pulse of direct current may involve changing the state of first machining tool 112 and or/second machining tool 114 from a non-electrified state to an electrified state.

In some examples, power supply 106 may be configured to supply pulsed direct current to second machining tool 114 at substantially the same time (e.g., the same or nearly the same) as current is supplied to first machining tool 112. In some examples, pulses of current may switch back and forth from being supplied to first machining tool 112 and second machining tool 114, such that the two machining tools do not simultaneously receive pulses of direct current. In some examples, as described, first machining tool 112 and second machining tool 114 may move in unison, so that they approach workpiece 120 from both sides at the same time and may receive a pulse of DC current at the same time. In some examples, first machining tool 112 and second machining tool 114 may be used out of phase with one another either in terms of oscillation stroke and/or pulse of current.

Control system 108 may be communicatively coupled to mechanical system 102, electrolyte system 104, and power supply 106, and configured to send control signals to mechanical system 102, electrolyte system 104, and power supply 106. For example, the control signals may cause mechanical system 102 to control (e.g., dynamically) a position of first machining tool 112 and second machining tool 114 relative to workpiece 120, cause electrolyte system 104 to supply electrolyte to a first interelectrode gap between first machining tool 112 and workpiece 120 and supply electrolyte to a second interelectrode gap between second machining tool 114 and workpiece 120, and cause power supply 108 to generate an electric potential between machining tool 112 and workpiece 120. Further operation of control system 108 will be described in FIG. 1D below.

Figure 1B:
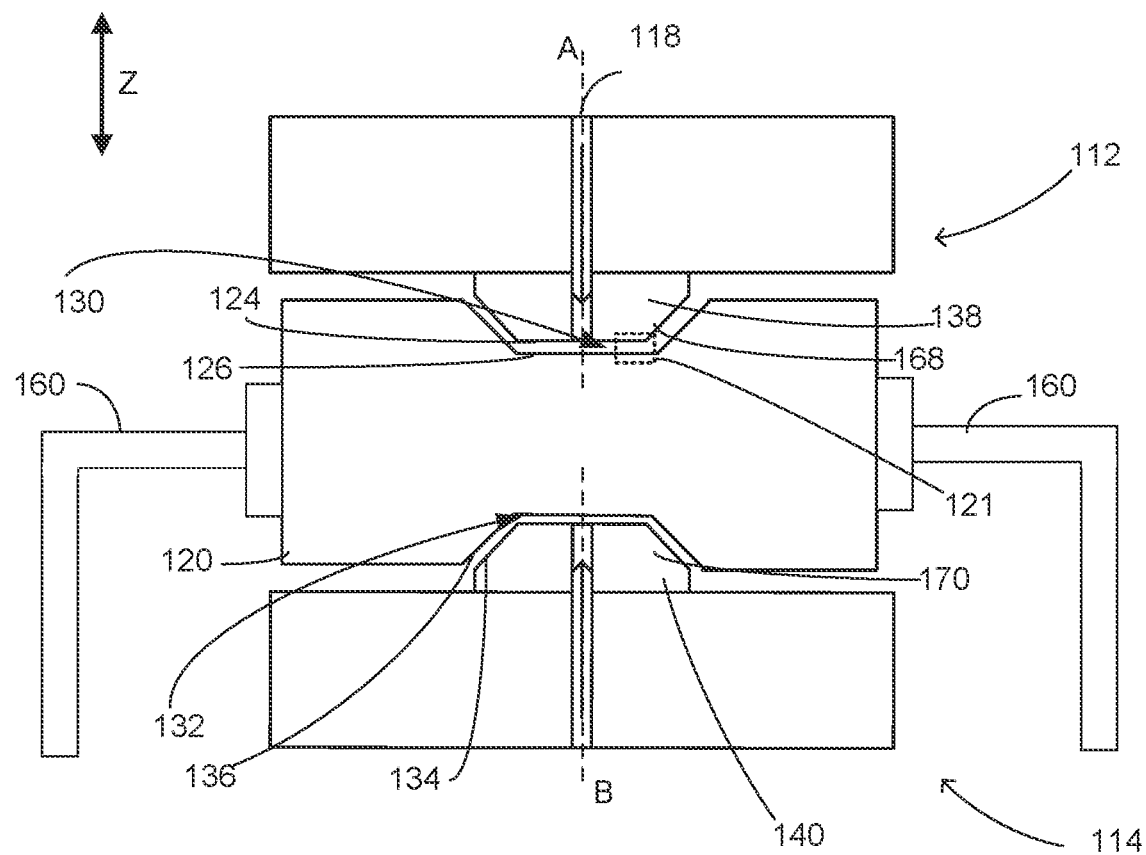
FIG. 1B is a side view cross-sectional conceptual diagram illustrating operation of the pECM tools of the pECM system of FIG. 1A.

First machining tool 112 defines a working surface that forms workpiece 120 into a component having a particular shape or set of dimensions (e.g., approximately the complimentary shape of machining tool 112). FIG. 1B is a side view cross-sectional conceptual diagram illustrating operation of first machining tool 112 and second machining tool 114 of pECM system 100 of FIG. 1A. First machining tool 112 includes first tool body 138 defining a first tool axis A. In some examples, first tool axis A aligns with an axis of actuation system 110 of FIG. 1A. Second machining tool 114 includes second tool body 140 defining a second tool axis B. In some examples, first tool axis A and second tool axis B may be substantially parallel (e.g., parallel or nearly parallel). For example, first tool axis A and second tool axis B may be substantially parallel and spaced apart, such that first machining tool 112 and second machining tool are configured to machine different areas of the same surface of workpiece 120, or different areas of opposite surfaces. In some examples, as illustrated first tool axis A and second tool axis B may be substantially collinear, such that first machining tool 112 and second machining tool are configured to machine the same or a similar area of opposite surfaces of workpiece 120, such that first machining tool 112 and second machining tool 114 may machine opposite surfaces to form an aperture in workpiece 120. In some examples, first tool axis A and second tool axis B may be disposed at another angle relative to each other suitable to machine a workpiece with both first machining tool 112 and second machining tool 114. For example, first tool axis A and second tool axis B may be disposed at an angle of about 30 degrees to about 60 degrees relative to each other, such as about 45 degrees. A pECM system including first tool body 112 which includes first tool body 138 defining first tool axis A and second machining tool 114 which includes second tool body 140 defining second tool axis B, where tool axes A and B are disposed at an angle of about 30 degrees to about 60 degrees relative to each other, such as about 45 degrees, may be advantageous in pECM machining certain types of components as workpiece 120 (e.g. a coversheet, a spar, or the like).

First tool body 138 includes first electrode 168 (e.g., which may function as one or more cathodes during at least a portion of a pECM process). While illustrated in FIG. 1B as including a single electrode, first tool body 138 may include multiple electrodes. In some examples, first electrode 168 defines first working surface 124 at a distal end of tool body 138. As used herein, the distal end of tool body 138 is the end of tool body 138 closest to workpiece 120. When first machining tool 112 is attached to actuation system 110, first working surface 124 is configured to face a corresponding target surface 126 of workpiece 120. In some examples, such as illustrated in FIG. 1B, tool body 138 may include an electrolyte channel 118 configured to receive an electrolyte from electrolyte system 104 (e.g., via mechanical system 102) and discharge the electrolyte through one or more openings near working surface 124 of first electrode 168.

First electrode 168 of first tool body 138 may be formed of an electrically conductive material at first working surface 124. Likewise, workpiece 120 may be an electrically conductive material. When an electric potential (e.g., in the form of a pulse direct current) is generated between first working surface 124 of first tool body 138 and first target surface 126 of workpiece 120 (e.g., with power supply under the control of control system 108), first working surface 124 may form a cathode surface and first target surface 126 may form an anode surface. As described above, first working surface 124 electrochemically machines first target surface 126 across interelectrode gap 130, without contact required between the surfaces. As first working surface 124 is advanced and material from workpiece 120 is removed, a shape of first target surface 126 may generally correspond to the complimentary shape of first working surface 124. While the shape of workpiece 120 is shown to mirror the shape of first working surface 124 in FIG. 1B, in other examples, the dimensions and shape formed in workpiece 120 from the removal of material from workpiece 120 do not exactly mirror the shape of first working surface 124.

The conductive materials of first electrode 168 and workpiece 120 may be any suitable conductive material such as metal, metal alloy, or ceramic material. Examples of metals that may be used to form the workpiece 120 and the electrode(s) 168 of first tool body 112 include nickel, iron, and titanium-based alloys in a variety of formats such as cast (including single crystal), forged, additively manufactured, and powdered metallurgy. Examples of suitable metals and metal alloys for the workpiece 120 and electrode(s) of first tool body 112 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, Al 6061, Al 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

In some examples, workpiece 120 is a nickel superalloys such as CMSX-4. The nickel superalloy may have a composition including Chromium (e.g., about 5.5 weight (wt %) to about 7.5 wt %), Cobalt (e.g., about 9 wt % to about 11 wt %), Molybdenum (e.g., about 0.3 wt % to about 0.9 wt %), Tungsten (e.g., about 5 wt % to about 7 wt %), e.g., with the balance being nickel. In some examples, such a nickel superalloy may also include Titanium (e.g., about 0.5 wt % to about 1.5 wt %), Titanium (e.g., about 0.5 wt % to about 1.5 wt %), Hafnium (e.g., about 0 wt % to about 0.2 wt %), Tantalum (e.g., about 5.5 wt % to about 6.5 wt %), Tantalum (e.g., about 5.5 wt % to about 6.5 wt %), Rhenium (e.g., about 2 wt % to about 4 wt %), and/or Rhenium (e.g., about 2 wt % to about 4 wt %) in trace amounts.

Second tool body 140 includes second electrode 170 (e.g., which may function as one or more cathodes during at least a portion of a pECM process). While illustrated in FIG. 1B as including a single electrode, second tool body 140 may include multiple electrodes. In some examples, second electrode 170 defines second working surface 134. In some examples, second working surface is at a distal end of second tool body 140. When second machining tool 114 is attached to second actuation system 116, second working surface 134 is configured to face a corresponding second target surface 136 of workpiece 120. In some examples, such as illustrated in FIG. 1B, second tool body 140 may include an electrolyte channel configured to receive an electrolyte from electrolyte system 104 (e.g., via mechanical system 102) and discharge the electrolyte through one or more openings near second working surface 134 of second electrode 170.

Second electrode 170 of second tool body 170 may be formed of an electrically conductive material at second working surface 134. Likewise, workpiece 120 may be an electrically conductive material. When an electric potential (e.g., in the form of a pulse direct current) is generated between second working surface 134 of second electrode 170 and second target surface 136 of workpiece 120 (e.g., with power supply under the control of control system 108), second working surface 134 may form a cathode surface and second target surface 136 may form an anode surface. As described above, second working surface 134 electrochemically machines second target surface 136 across second interelectrode gap 132, without contact required between the surfaces. As second working surface 134 is advanced and material from workpiece 120 is removed, a shape of second target surface 136 may generally correspond to the complimentary shape of second working surface 134. While the shape of workpiece 120 is shown to mirror the shape of second working surface 134 in FIG. 1B, in other examples, the dimensions and shape formed in workpiece 120 from the removal of material from workpiece 120 do not exactly mirror the shape of second working surface 134.

The conductive material(s) of second electrode 170 of second tool body 140 of second machining tool 114 may be any suitable conductive material as described with respect to first electrode 168 of first tool body 138 of first machining tool 112 above.

Figure 1C:
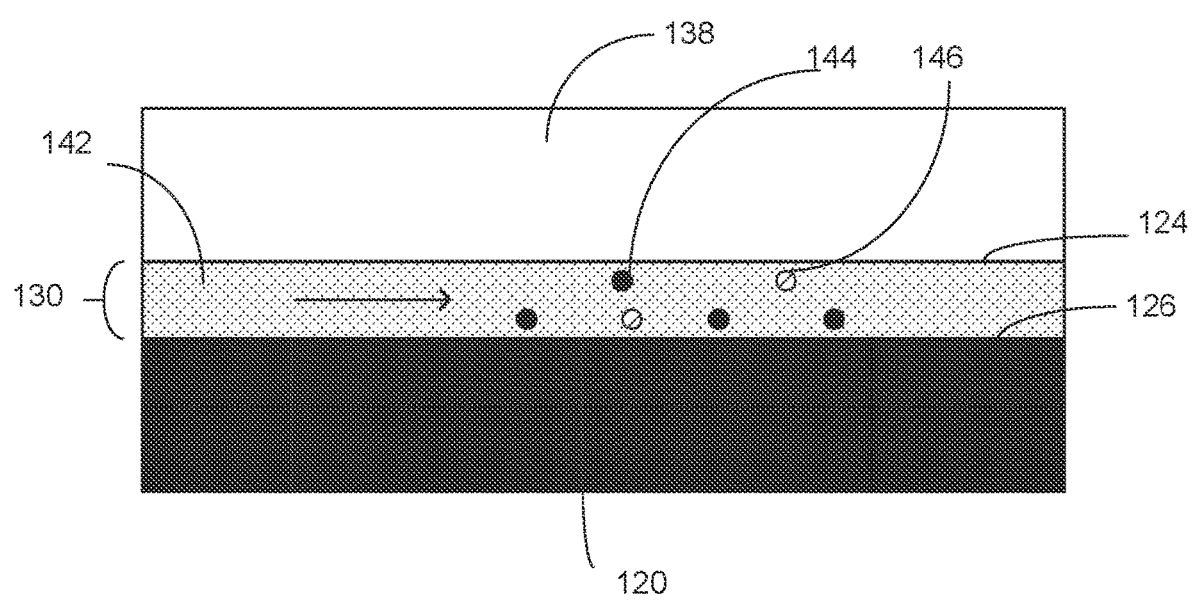
FIG. 1C is a side view cross-sectional conceptual diagram illustrating a magnified view of a portion of FIG. 1B.

FIG. 1C is a side view cross-sectional conceptual diagram showing a magnified view within window 121 indicated in FIG. 1B to illustrate operating principles of the first and second pECM tools 112 and 116 of FIG. 1B. First working surface 124 of first electrode 168 of first tool body 138 is positioned relative to first target surface 126 of workpiece 120 to form first interelectrode gap 130, and electrolyte 142 flows through first interelectrode gap 130. When an electric potential (e.g., in the form of a pulse direct current) is generated between first working surface 124 and first target surface 126, current flows from first working surface 124 to first target surface 126 via electrolyte 142 to form an electrolytic cell. The current dissolves material at target surface 126 to generate electrochemical reaction products that include dissolved material 144, hydrogen gas 146, and heat. Electrolyte 142 carries away the electrochemical reaction products from interelectrode gap 130. In general, material removal rate may be related to current density in interelectrode gap 130. The current density in interelectrode gap 130 may be related to a variety of parameters including, but not limited to: spatial parameters, such as a distance of interelectrode gap 130; electrical parameters, such as an electric potential across interelectrode gap 130; electrolyte parameters, such as a flow rate of electrolyte 142; and other parameters that may affect flow of current from working surface 124 to target surface 126. As mentioned above, in some examples, pulses of current may be coordinated with oscillations of first tool body 138 towards and away from first target surface 126 of workpiece 120.

Figure 1D:
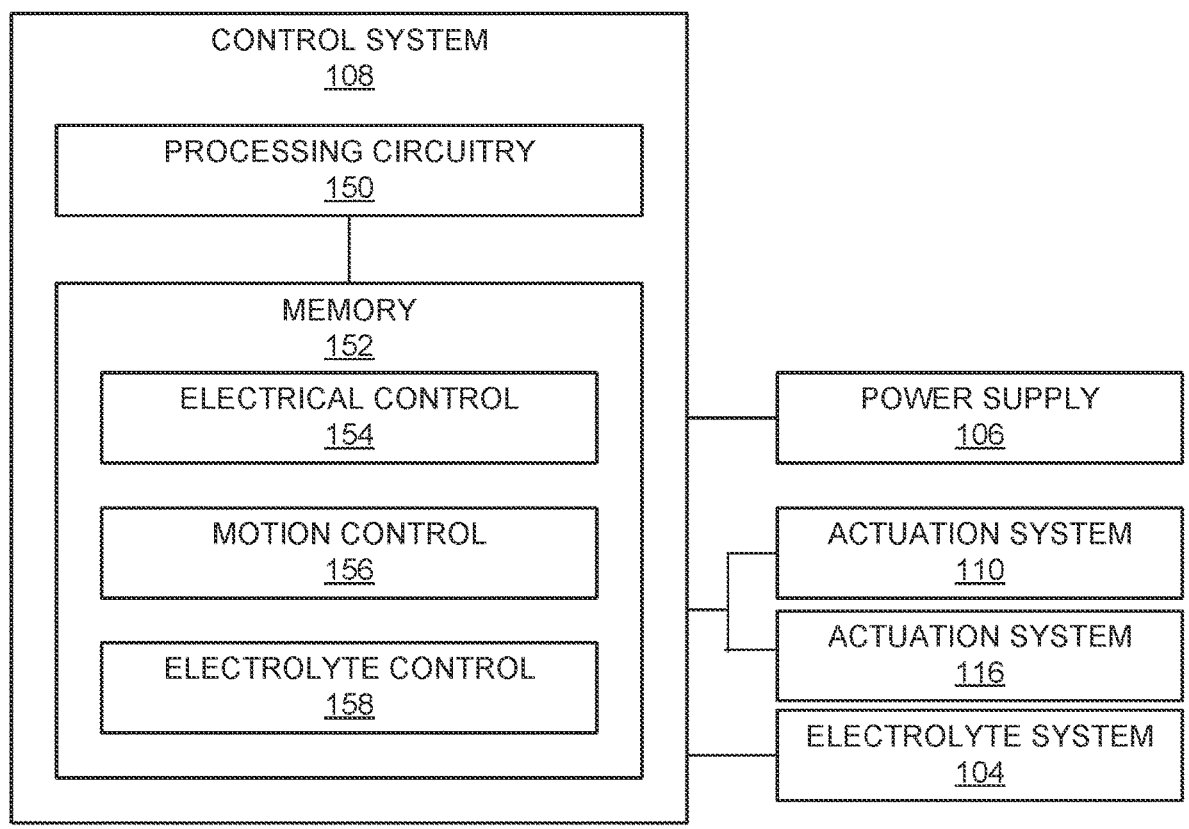
FIG. 1D is a conceptual block diagram illustrating an example control system of the pECM system of FIG. 1A.

FIG. 1D is a conceptual block diagram illustrating an example control system 108 of pECM system 100 of FIG. 1A. Control system 108 includes processing circuitry 150 and a memory 152. Memory 152 includes computer-readable instructions that, when executed by processing circuitry 150, causes computing system 150 to perform various functions related to control of components of pECM system 100. Processing circuitry 150 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 150 herein may be embodied as software, firmware, hardware or any combination thereof. Memory 152 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 152 may store any suitable information, including information for executing one or more electrochemical machining processes with which pECM system 100 performs on workpiece 120. For example, memory 152 may store one or more of electrical control instructions 154, motion control instructions 156, and electrolyte control instruction 158 in separate memories within memory 152 or separate areas within memory 152. Electrical control 154, motion control 156, and electrolyte control 158 may, in combination, define parameters that control pECM system 100 to remove material from workpiece 120 to generate a component having particular dimensions. In some examples, workpiece 120 may be a partially fabricated component having relatively rough dimensions, such that the pECM process may further refine workpiece 120 to relatively fine dimensions.

Electrical control 154 may define values for electrical parameters of a pECM process including, but not limited to, voltage amplitude applied to first electrode 168 and/or second electrode 170 and workpiece 120, frequency of electric current, duty cycle (e.g., pulse length), current amplitude, and other electric parameters associated with control of current across interelectrode gap 130, 132. Processing circuitry 150 may generate and send control signals that include the electrical parameters to electrical control circuitry of power supply 106.

Motion control 156 may define values for motion parameters of a pECM process including, but not limited to, feed rate of first machining tool 112, second machining tool 114, position of first machining tool 112 and/or second machining tool 114 (e.g., depth limit of the machining tool), frequency of oscillation of first machining tool 112 and/or second machining tool 114, amplitude of oscillation of machining tool 112 and/or second machining tool 114, length of first interelectrode gap 130 and/or second interelectrode gap 132, and other motion parameters associated with control of relative and/or time-varying position of first working surface 124 and/or second working surface 134. Processing circuitry 150 may generate and send control signals that include the motion parameters to actuation circuitry of first actuation system 110 and/or second actuation system 116.

Electrolyte control 158 may define values for electrolyte parameters of a pECM process including, but not limited to, flow rate of electrolyte 142 through first interelectrode gap 130, temperature of electrolyte 142, and other electrolyte parameters associated with conditions of electrolyte 142 in first interelectrode gap 130. Processing circuitry 150 may generate and send control signals that include the electrolyte parameters to electrolyte control circuitry of electrolyte system 104.

Figure 1E:
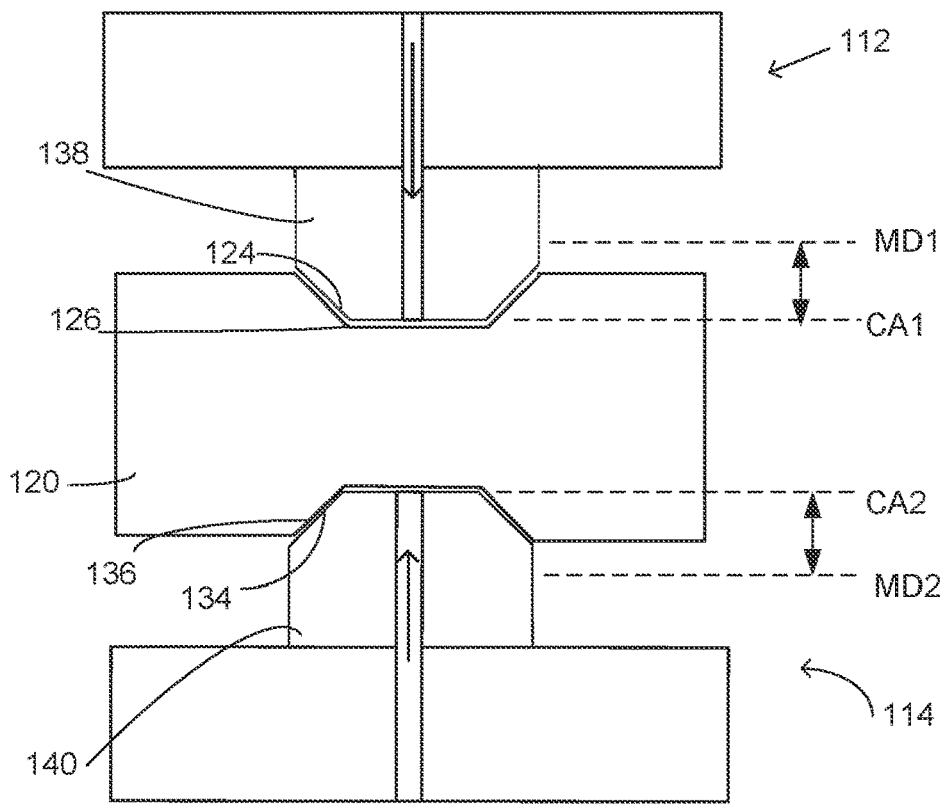
FIG. 1E is a side view cross-sectional conceptual diagram illustrating an example operation of the pECM tools of FIG. 1B.
Figure 1F:
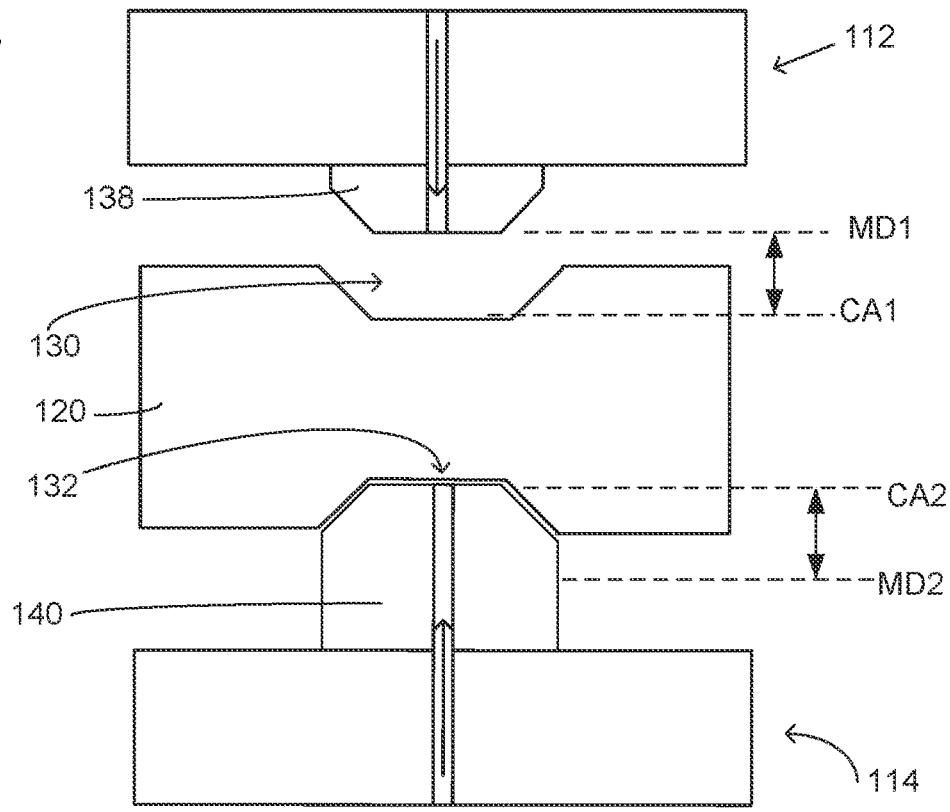
FIG. 1F is a side view cross-sectional conceptual diagram illustrating an operation of the pECM tools of FIG. 1 B.

FIGS. 1E and 1F illustrate example operations of machining tools 112 and 114 of system 100 from a cross-sectional side view. As mentioned above, control system 108 (not pictured) may cause first actuation system 110 and/or second actuation system 116 to move first working surface 124 of first electrode 168 of tool body 138 of first machining tool 112 toward first target surface 126 of workpiece 120 and/or second working surface 134 of second electrode of second tool body 140 of second machining tool 114 toward second target surface 136 of workpiece 120. As mentioned above and illustrated in FIG. 1D, first target surface 124 and second target surface 136 of workpiece 120 may be opposite surfaces of workpiece 120.

As noted above, the movement of first machining tool 112 relative first target surface 126 of workpiece 120 may be in an oscillating fashion (e.g., repeatedly up and down about first axis A). Likewise, the movement of second machining tool 114 relative second target surface 136 of workpiece 120 may be in an oscillating fashion (e.g., repeatedly up and down along second axis B). For example, in some examples, at least one of first tool body 138 or second tool body may be configured to oscillate during pECM operations relative to workpiece 120. In some examples, first tool body 138 and second tool body 140 may both oscillate during pECM operations, e.g., in coordination with each other or independent of the movement of the other tool body. First tool body 138 may oscillate at an appropriate frequency for pECM operations such that first working surface 124 moves relative to workpiece 120 between a closest approach CA1 and a most distant point MD1 from first target surface 126 of workpiece 120. Since first target surface 126 may be machined away during pECM operations, in some examples, closest approach CA1 and/or most distant point MD1 may be dynamically adjusted. In some examples, closest approach CA1 may be dynamically adjusted (e.g., due to first electrode 168 being fed toward workpiece 120) during the pECM operation to maintain a constant first interelectrode gap 130.

Similarly, second tool body 140 may oscillate such that second working surface 134 moves relative to workpiece 120 between a closest approach CA2 and a most distant point MD2 from second target surface 136 of workpiece 120. Since second target surface 136 may be machined away during pECM operations, in some examples, closest approach CA2 and/or most distant point MD2, may be dynamically adjusted. In some examples, closest approach CA2 may be dynamically adjusted (e.g., due to first electrode 168 being fed toward workpiece 120) during the pECM operation to maintain a constant second interelectrode gap 130.

Example frequencies for the oscillating movement of first tool body 138 and second tool body 140 may be about 20 Hz to about 100 Hz. In some examples, first tool body 138 and second tool body 140 may oscillate at the same frequency or at different frequencies during a pECM process. The illustrations in FIGS. 1E and 1F showing the distance between the closest approach (CA) and most distant point of may not be to scale, but are illustrated as relatively large distances for clarity.

FIG. 1E is a conceptual diagram illustrating the movement of first tool body 138 and second tool body 140 relative to workpiece 120 for an example operating mode of pECM system 100 that may be employed during a pECM process on workpiece 120. In this example, both first tool body 138 and second tool body 140 are configured to oscillate between corresponding closest approach (CA) and most distant (MD) points from the workpiece. As illustrated at a snapshot in time in FIG. 1E and shown by the timing diagram of FIG. 4, in this example operating mode, the position of first tool body 138 and second tool body 140 are coordinated such that they reach their corresponding closest approach at substantially the same time, and reach their corresponding most distant point at substantially the same time. In other words, when first working surface 124 of first tool body 138 is at point CA1, second working surface 134 of second tool body 140 is closer to point CA2 than it is to MD2, and vice versa.

Figure 4:
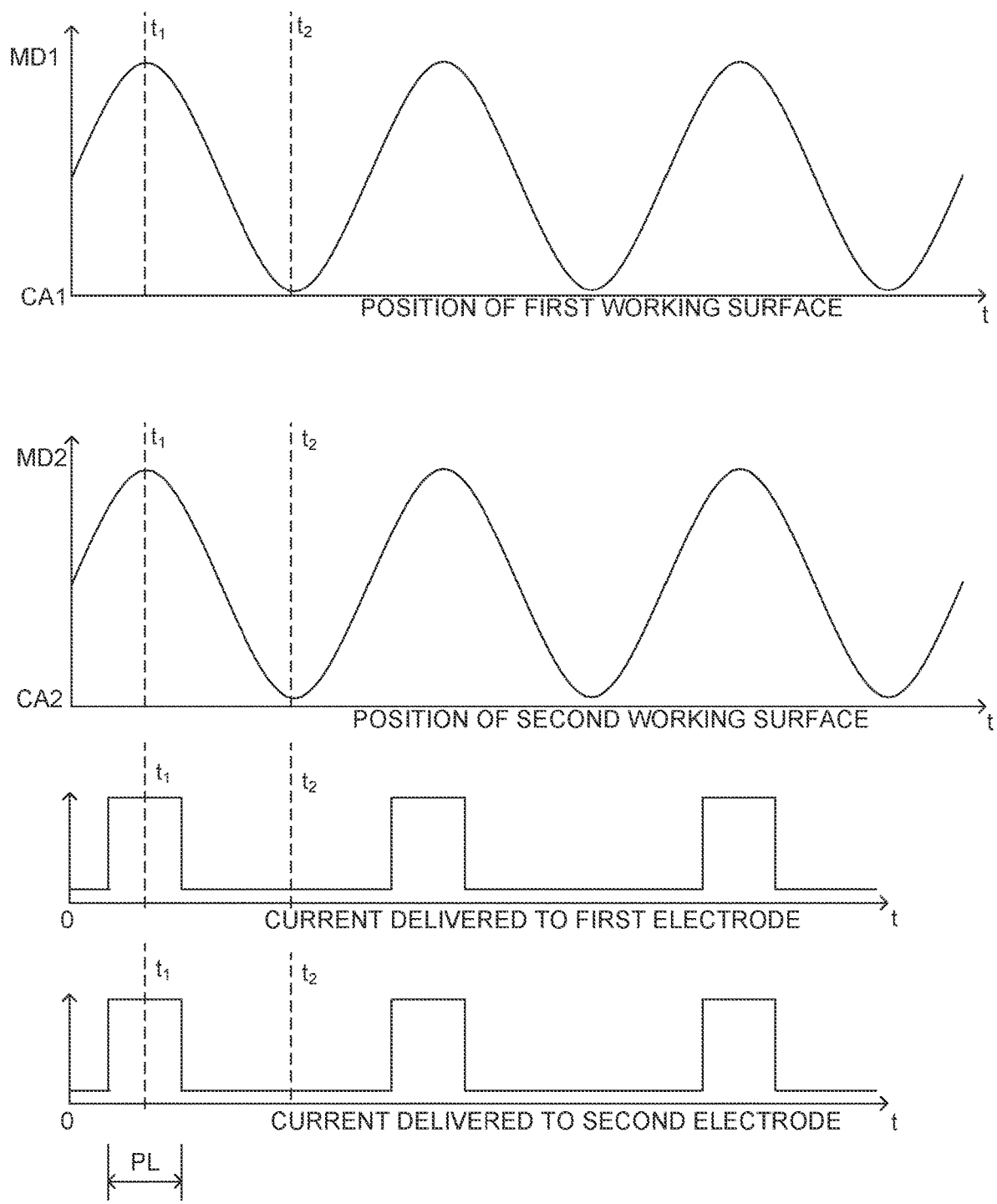
FIG. 4 is a time/position chart illustrating the position of the machining tools of FIG. 1B according to the operation of FIG. 1E.

FIG. 4 is a timing diagram illustrating the position of first working surface 124 of first tool body 138 and second working surface 134 of second tool body 140 over a period of time when pECM system 100 is operated according to the example of FIG. 1E. At time $t_1$, both first tool body 138 and second tool body 140 reach their corresponding most distant point from the workpiece, while at time $t_2$, both first tool body 138 and second tool body 140 reach their corresponding closest approach to the workpiece. Positions of first tool body 138 and second tool body 140 in FIG. 4 may be representative of only a small portion of the overall time for the pECM process. The movement of first tool body 138 and second tool body 140 may be continued as represented in FIG. 4 over a period of time as appropriate to complete pECM machining a workpiece, such as workpiece 120. In the example operating mode of FIG. 4, the oscillation frequency of first tool body 138 and second tool body 140 is substantially the same, and is coordinated such that each tool body reaches the corresponding closest approach CA at substantially the same time. Since pressure of electrolyte in first interelectrode gap 130 and second interelectrode gap may be highest when the corresponding tool body reaches its closest approach point, operating pECM system 100 according to the example of FIGS. 1E and 4 may allow for opposing forces to substantially cancel out, and reduce or eliminate the need for additional mechanical supports 160 to be included in containment and fixturing system 118. Simultaneous machining of workpiece 120 from opposing sides at target surfaces 126 and 136 with a pECM system including two tool bodies 138 and 140 may allow for improved throughput of pECM operations.

FIG. 4 also illustrates a timing diagram illustrating the current delivered to first electrode 168 of first tool body 138 and second electrode 170 of second tool body 140 over the same period of time illustrated with respect to the positions of first working surface 132 and second working surface 134 as described above. A pulse of DC current may be delivered to first electrode 168 and second electrode 170 at time $t_2$, when first working surface 132 and second working surface 134 reach their corresponding point of closest approach CA1, CA2. The pulsed direct current may not be delivered to first electrode 168 and second electrode 170 at time $t_1$, when first working surface 132 and second working surface 134 reaches their corresponding most distant point from the workpiece MD1, MD2. In the example of FIG. 4, since the position of first tool body 138 and second tool body 140 are coordinated such that each tool body reaches the corresponding closest approach CA at substantially the same time, first electrode 168 and second tool body 140 may receive a pulse of direct current at substantially the same time. While all the pulses shown in FIG. 4 (and other timing diagrams) are rectangular pulses, other pulse waveforms may be employed, e.g., with the pulses being defined by a sinusoidal waveform or the like. The timing of the pulses for first machining tool 112 and/or second machining tool 114 may be controlled using control system 108 to occur at any point during the oscillation stroke of the machining tool.

In some examples, the pulse of direct current may have a pulse length PL. In some examples, pulse length PL may be any suitable length of time. In some examples, pulse length PL may be coordinated with a frequency of oscillation of tool body, such that the pulse of DC current occurs for a portion of each cycle of the tool body. In some examples, the pulse may be configured to be delivered for about one tenth to about one half of each cycle. In some examples, as illustrated, the pulse may be centered on the point of closest approach CA such that about 50% of the pulse occurs before working surface 132, 134 reaches point of closest approach CA1, CA2, and 50% of the pulse occurs after working surface 132, 134 reaches point of closest approach CA1, CA2. In some examples, the timing of the pulse may be shifted based on the of the geometry of workpiece 120 and/or the flow of electrolyte 142.

FIG. 1F is a conceptual diagram illustrating the movement of first tool body 138 and second tool body 140 relative to workpiece 120 for another example operating mode of pECM system 100 that may be employed during a pECM process on workpiece 120. In this example, both first tool body 138 and second tool body 140 are configured to oscillate between corresponding closest approach and most distant points from the workpiece. As illustrated at a snapshot in time in FIG. 1F and shown by the timing diagram of FIG. 5, in this example operating mode, first tool body 138 and second tool body 140 are coordinated such that when first tool body 138 reaches closest approach CA1, second tool body 140 reaches most distant point MD2 from workpiece 120 at substantially the same time, and vice versa. In other words, when first working surface 124 of first tool body 138 is at point CA1, second working surface 134 of second tool body 140 is closer to point MD2 than it is to point CA2, and vice versa.

Figure 5:
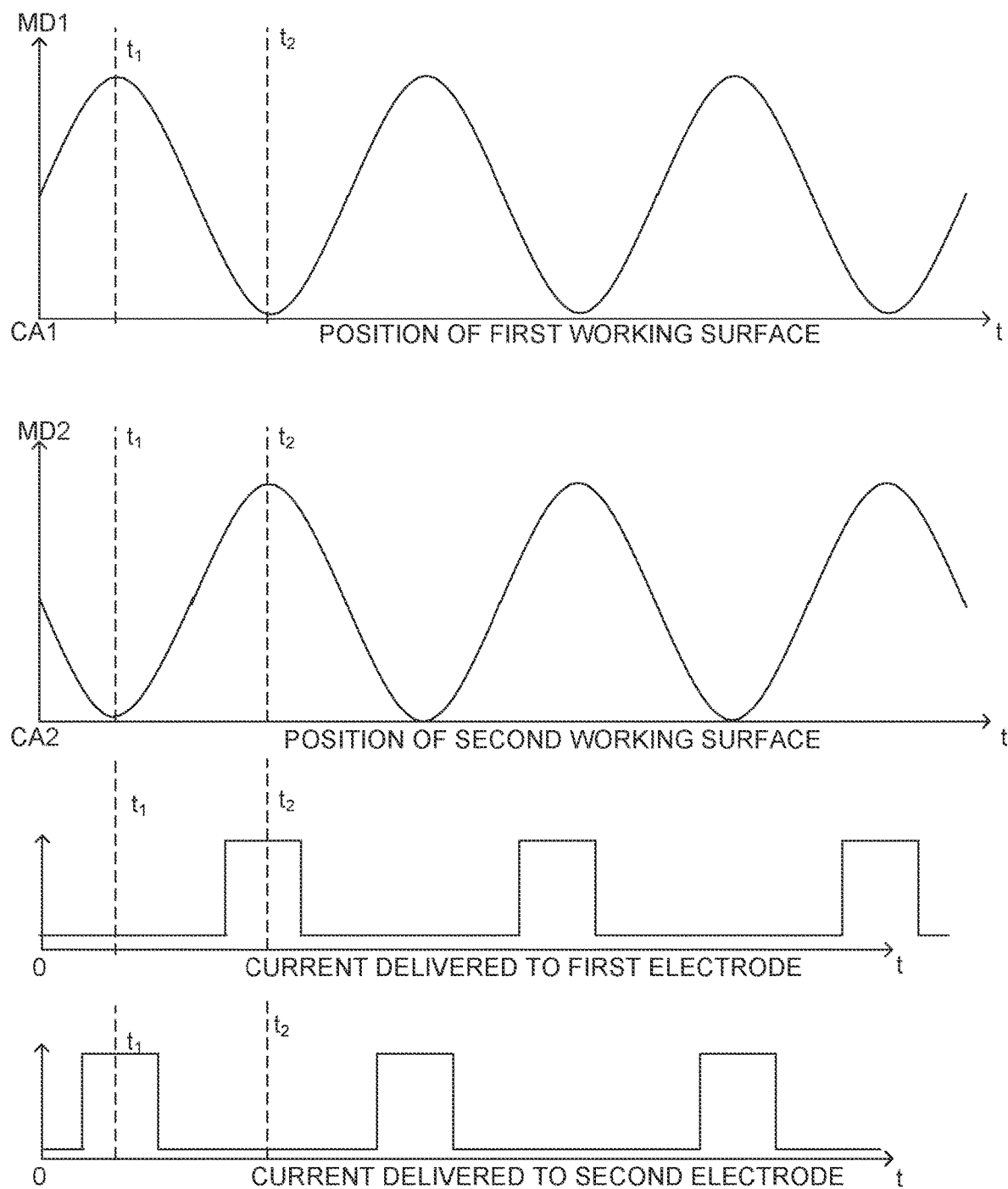
FIG. 5 is a time/position chart illustrating the position of the machining tools of FIG. 1B according to the operation of FIG. 1F.

FIG. 5 is a timing diagram illustrating the position of first tool body 138 and second tool body 140 over a period of time when pECM system 100 is operated according to the example of FIG. 1E. At time $t_1$, first tool body 138 reaches most distant point MD1 from workpiece 120, while second tool body 140 reaches closest approach CA2. Accordingly, at time $t_2$, first tool body 138 reaches closest approach CA1 from workpiece 120, while second tool body 140 reaches most distant point MD2. Positions of first tool body 138 and second tool body 140 in FIG. 5 may be representative of only a small portion of the overall time for the pECM process. The movement of first tool body 138 and second tool body 140 may be continued as represented in FIG. 5 over a period of time as appropriate to complete pECM machining a workpiece, such as workpiece 120. In the example operating mode of FIG. 5, the oscillation frequency of first tool body 138 and second tool body 140 is substantially the same, and is coordinated such that when first tool body 138 reaches corresponding closest approach CA1, second tool body 140 reaches corresponding most distant point MD2 at substantially the same time, and vice versa. Operating pECM system 100 in accordance with the example of FIGS. 1F and 5 may allow electrolyte in first interelectrode gap 130 to act as a damper when second tool body 140 is moving toward workpiece 120, which may protect first target surface 126 from being damaged by being forced into first tool body 138 or parts of containment and fixturing system 118 during pECM operations.

FIG. 5 also illustrates a timing diagram illustrating the current delivered to first electrode 168 of first tool body 138 and second electrode 170 of second tool body 140 over the same period of time illustrated with respect to the positions of first working surface 132 and second working surface 134 as described above. A pulse of DC current may be delivered to second electrode 170 at time $t_1$, when second working surface 134 reach their corresponding point of closest approach CA2. Similarly, a pulse of DC current may be delivered to first electrode 168 at time $t_2$, when first working surface 132 reaches point of closest approach CA1. The pulse of direct current may not be delivered to first electrode 168 at time $t_1$, when first working surface 132 reaches most distant point from the workpiece MD1. The pulse of direct current may not be delivered to second electrode 170 at time $t_2$, when second working surface 134 reaches most distant point from the workpiece MD2. In the example of FIG. 5, since the position of first tool body 138 and second tool body 140 are coordinated such that each first tool body 138 reaches closest approach CA1 at substantially the same time as second tool body 140 reached most distant point MD2, each tool body 138, 140 may receive a pulse of direct current at different times, as illustrated.

Operation of pECM system 100 in accordance with the operating mode examples illustrated by FIGS. 1E and 1F may be useful for pECM machining of various workpieces. In some examples, when workpiece 120 is an airfoil coversheet, the airfoil coversheet may not include protrusions, rather including only through holes. In some examples, workpiece 120 may include a nickel superalloy. In some examples, workpiece 120 may be an airfoil coversheet, and first tool body 138, second tool body 140, or both combined may machine workpiece to form apertures through workpiece 120 that may be cooling holes in an airfoil coversheet that is later bonded or otherwise attached to a spar to form a dual wall airfoil. In some examples, workpiece 120 may be an airfoil coversheet, and first tool body 138, second tool body 140, or both combined may machine finish opposite sides of the workpiece 120 (e.g. the bond side and/or the aero side). For example, suitable workpieces 120 may include one or more of those airfoil components or airfoil coversheets described in U.S. Pat. No. 10,436,040 granted Oct. 8, 2019 and U.S. Pat. No. 8,464,426 granted Jun. 18, 2013, the entire content of each of these patents is incorporated herein by reference.

Other operating modes of pECM system 100 are considered. In some examples, first tool body 138 may be stationary while second tool body 140 is configured to oscillate, or vice versa. In some examples, one or both tool bodies may oscillate during only a portion or portions of a pECM process, and remain stationary during other portions. In some examples, stationary periods and oscillatory periods of first tool body 138 may be coordinated with stationary and/or oscillatory periods of second tool body 140 (e.g., first tool body 138 oscillates while second tool body is stationary, and vice versa). In some examples, first tool body 138 and second tool body 140 may operate independent of each other. In some examples, maintaining one tool body stationary while the other tool body is configured to oscillate may be beneficial to pECM machine an asymmetrical workpiece. In some examples, maintaining one tool body stationary while the other tool body is configured to oscillate may be beneficial to pECM machine a flexible workpiece (e.g., a coversheet) because the stationary tool body may provide increased structural rigidity to workpiece 120 during machining.

Figure 6:
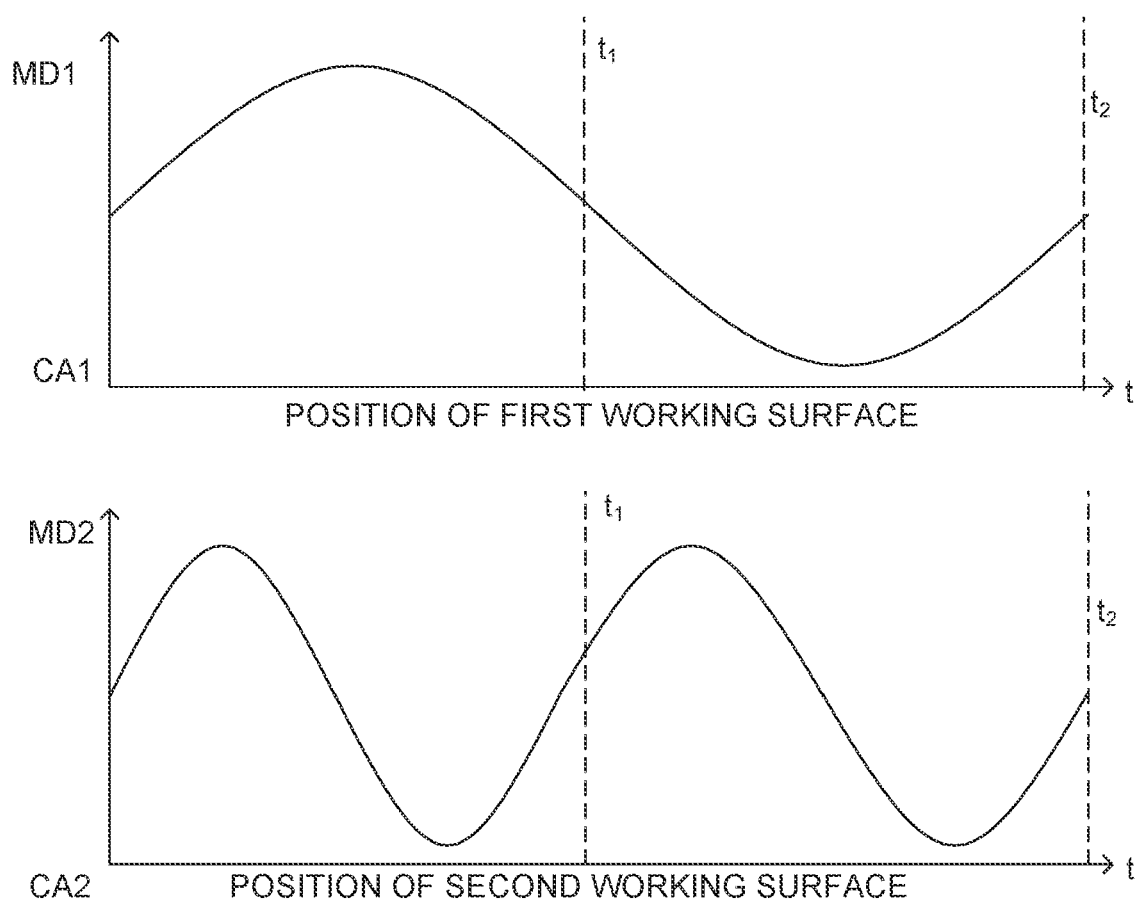
FIG. 6 is a time/position chart illustrating the position of the machining tools of FIG. 1A according to an example operation of the pECM system of FIG. 1A.

In some examples, as illustrated in FIG. 6, first tool body 138 and second tool body 140 may be configured to oscillate at different frequencies. In some examples, first tool body 138 and second tool body 140 may operate at frequency where the frequency of the tools are different, but second tool body operates at a harmonic frequency of first tool body 138 (e.g., two, three, or four times the frequency of first tool body 138). For example, as illustrated in FIG. 6, second tool body 140 oscillates at two times the frequency of first tool body 138. At time $t_1$, when first tool body 138 has complete only approximately one half of one cycle, second tool body 140 has completed a full cycle. At time $t_2$, when first tool body 138 has completed one cycle, second tool body 140 has completed two revolutions. In some examples, the oscillations of first tool body 138 and second tool body 140 may be harmonically coordinated to reach their corresponding CA at substantially the same time at regular intervals (e.g., every second cycle of the higher frequency tool body, every third cycle of the higher frequency tool body, or the like). In some examples, oscillations of first tool body 138 and second tool body 140 may be harmonically coordinated such that when first tool body reaches corresponding closest approach CA1, second tool body 140 reaches corresponding most distant point MD2 at substantially the same time at regular intervals (e.g., every second cycle of the higher frequency tool body, every third cycle of the higher frequency tool body, or the like). In some examples, the corresponding frequencies of first tool body 138 and second tool body 140 may be different so that closest approaches CA1 and CA2 are reached substantially at the same time at regular intervals, and first tool body 138 reaches closest approach CA1 at substantially the same time as second tool body 140 reaches most distant point MD2 at regular intervals. In some examples, oscillations of first tool body 138 and second tool body 140 may be coordinated such that no tool body reaches its closest approach at the same time as another tool body reaches its corresponding most distant point. In some examples, oscillations of first tool body 138 and second tool body 140 may be coordinated such that no tool body reaches its closest approach at the same time as another tool body reaches its corresponding closest approach.

Figure 2:
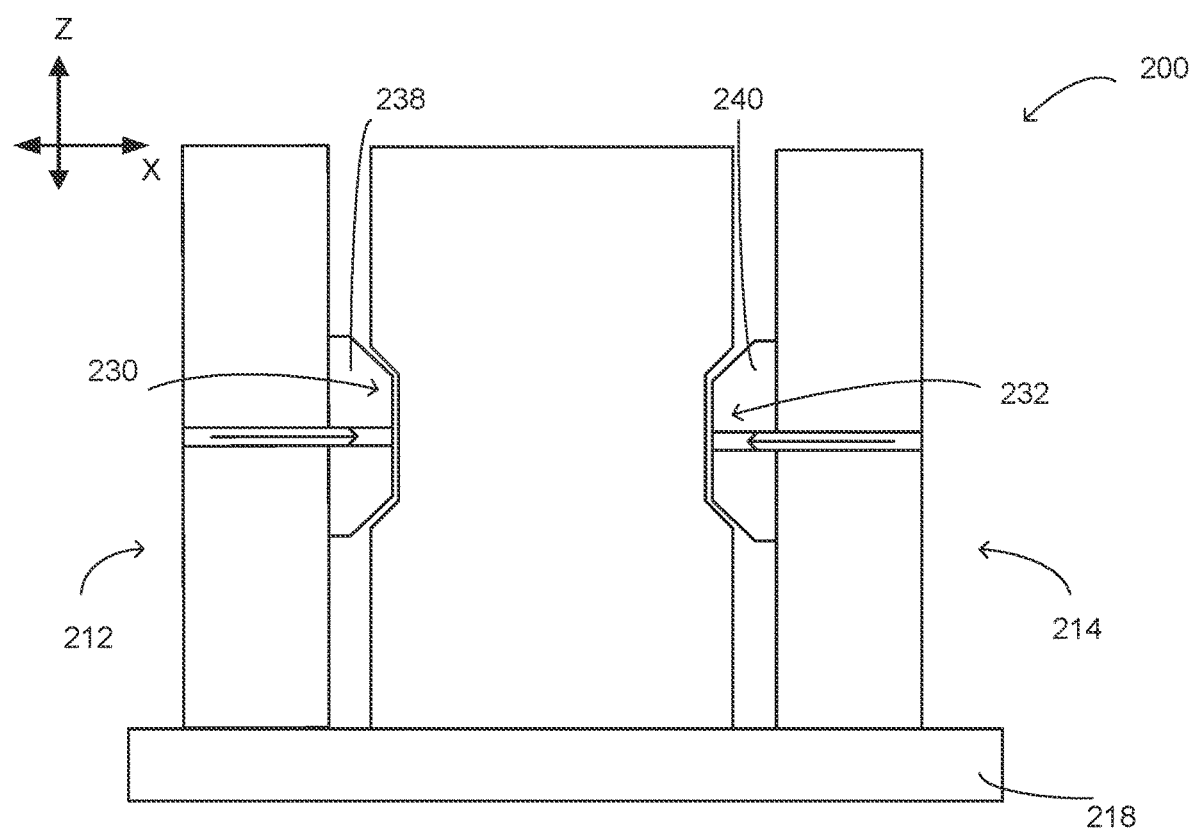
FIG. 2 is a side view cross-sectional conceptual diagram illustrating operation of example first and second pECM tools.

FIG. 2 illustrates a portion of example pECM system 200 including first machining tool 212, which includes first tool body 238, and second machining tool 214, which includes second tool body 240. pECM system 200 may be substantially the same as was described for pECM system 100 with respect to FIGS. 1A-1F, differing only as described below. Similar features between systems 100 and 200 are similarly numbered. In some examples, as illustrated by first machining tool 112 and second machining tool 114 of FIG. 1B, the first tool body 138 and second tool body 140 may be spaced apart in a direction substantially parallel to a gravitational force, where a gravitational force is defined as downward along the Z-axis of FIG. 1B. In some examples, as illustrated by first tool body 238 and second tool body 240 of FIG. 2, first tool body 238 and second tool body 240 are spaced apart in a direction substantially perpendicular to a gravitational force (orthogonal to the Z-axis of FIG. 2). Advantageously, spacing apart first tool body 238 and second tool body 240 in a direction substantially perpendicular to a gravitational force may allow for gravity to assist in removing debris (e.g., dissolved anodic material) from both first interelectrode gap 230 and second interelectrode gap 232. In some examples, first machining tool 212 and second machining tool 214 may be arranged in any manner relative to a gravitational force.

FIG. 4 is a flow diagram illustrating an example technique for controlling a pECM system such as pECM system 100 of FIG. 1A-1F to perform a pECM process on a workpiece. For ease of description, the example technique of FIG. 4 is described with regard to system 100 and workpiece 120. However, the example technique of FIG. 4 may be carried out using any suitable system configured for pECM. While illustrated sequentially, the various steps of FIG. 4 may be initiated in a different order (or sequentially) to remove material from workpiece 120.

As described above, control system 108 may cause first actuation system 110 to position first working surface 124 of first tool body 138 relative to first target surface 126 of workpiece 120 to control the size of first interelectrode gap 130 and advance first working surface 124 toward first target surface 126 as material is removed from workpiece 120. Control system 108 may cause first actuation system 110 or second actuation system 116 to position second working surface 134 of second tool body 138 relative to second target surface 136 of workpiece 120 to control the size of second interelectrode gap 132 and advance first working surface 124 toward target surface 126 as material is removed from workpiece 120. In some examples, first interelectrode gap 130 and/or second interelectrode gap 132 may be on the order of about 10 microns although other values are contemplated.

Control system 108 may control electrolyte system 104 to deliver electrolyte 142 into first interelectrode gap 130 between first working surface 124 of first electrode 168 and first target surface 126 of workpiece 120 to form an electrolytic cell between first electrode 168 and workpiece 120, and control electrolyte system 104 to deliver electrolyte 142 into second interelectrode gap 132 between second working surface 134 of second tool body 140 and second target surface 136 to form an electrolytic cell between second electrode 170 and workpiece 120 (400). In some examples, delivery of electrolyte 142 into the first and second interelectrode gaps may be from the same source. In some examples, electrolyte 142 may be delivered from different sources (e.g., a first electrolyte supply and a second electrolyte supply). In some examples, electrolyte 142 may be delivered to first interelectrode gap 130 and second interelectrode gap 132 at substantially the same (e.g., the same or nearly the same) flowrate.

In some examples, first working surface 124 of first electrode 168 of tool body 138 and second working surface 134 of second electrode 170 of tool body 138 may be spaced apart and face each other. In some examples, the technique of FIG. 3 includes oscillating at least one of first tool body 138 or second tool body 140 between a closest approach and a most distant point from workpiece 120 (402).

Control system 108 may control power supply 106 to generate a pulsed direct current between first electrode 168 of first tool body 138 and workpiece 120 and generate a pulsed direct current between second electrode 170 of second tool body 140 and workpiece 120 (404). In some examples, pulses of direct current may be delivered between first electrode 168 and workpiece 120 and second electrode 170 and workpiece 120 at substantially the same time. In some examples, pulses of direct current between first electrode 168 and workpiece 120 and/or second electrode 170 and workpiece 120 may be delivered at an appropriate frequency for pECM machining. In some examples, pulses of direct current may be delivered at different frequency between first electrode 168 and workpiece 120 and second electrode 170 and workpiece 120. For example, pulses of direct current may be coordinated to be delivered to each corresponding electrode when the electrode reaches its corresponding closest approach.

In some examples, control system 108 may control actuation system 110 and/or second actuation system 116 to oscillate both first tool body 138 and second tool body 140 between a closest approach and a most distant point from workpiece 120, and coordinate first tool body 138 and second tool body 140 such that the tool bodies reach their closest approach at substantially the same time.

In some examples, control system may control both first tool body 138 and second tool body 140 to oscillate between a closest approach and a most distant point from workpiece 120, and control system 108 may coordinate first actuation system 110 and/or second actuation system 116 such that first tool body 138 and second tool body 140 such that when first tool body 138 reaches its closest approach, second tool body 140 reaches its most distant point from workpiece 120. Other techniques are considered, as was described above with respect to FIG. 6.

Figure 3:
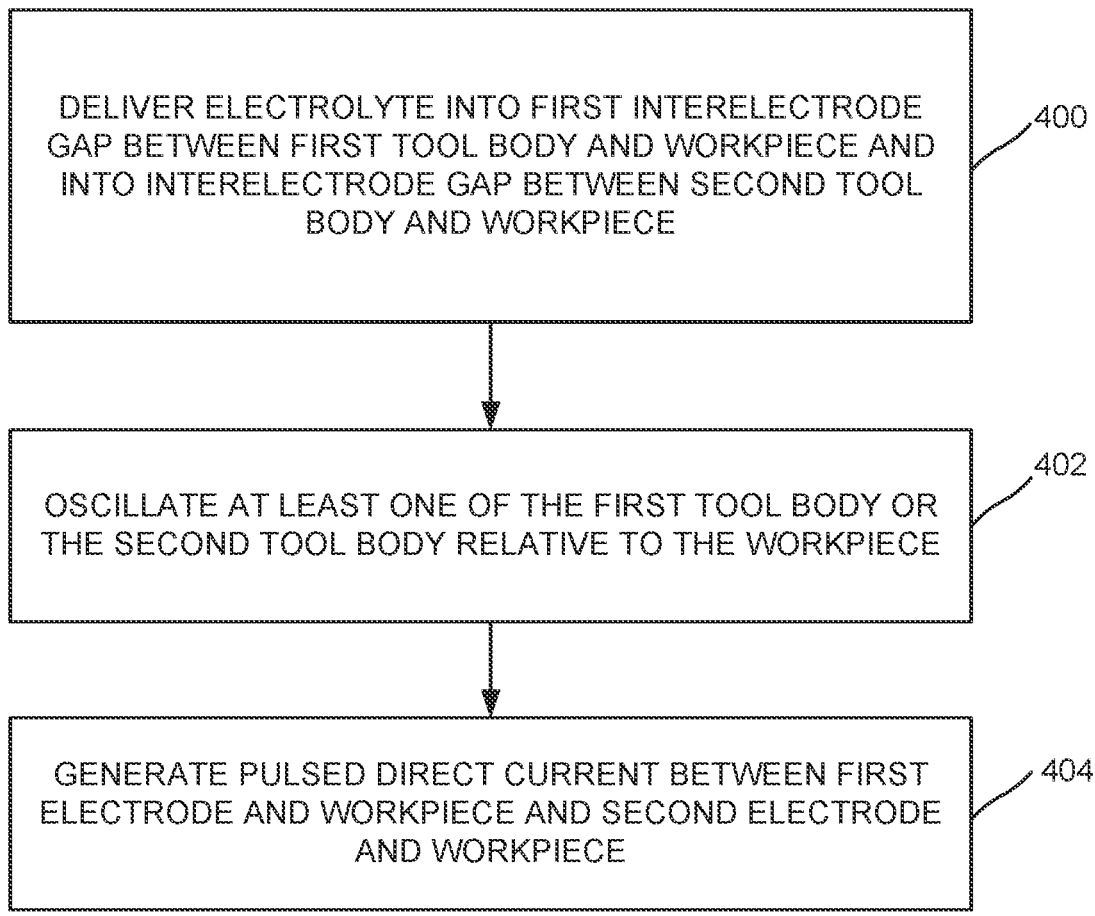
FIG. 3 is a flow diagram illustrating an example technique for controlling the pECM system of FIG. 1A-1F.

In some examples, the technique of FIG. 3 may include positioning workpiece 120 between first tool body 138 and second tool body 140. In some examples, the technique pf FIG. 3 may include pECM machining first target surface 126 and second target surface 136 located on opposite sides of workpiece 120, which may be desirable to form an aperture in workpiece 120, or to machine finish opposite sides of workpiece 120, such as an airfoil coversheet.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following numbered examples and claims.

Example 1: A pulsed electrochemical machining system includes a first tool body defining a first tool axis, the first tool body includes a first interelectrode gap between the first working surface of the first tool body and a first target surface of the workpiece; a second interelectrode gap between the second working surface of the second tool body and a second target surface of the workpiece; and a power supply configured to generate a pulsed direct current between the first tool body and the workpiece and the second tool body and the workpiece.

Example 2: The pulsed electrochemical machining system of example 1, wherein the first tool axis of the first tool body is substantially parallel to the second tool axis of the second tool body.

Example 3: The pulsed electrochemical machining system of example 1 or 2, wherein the first tool axis of the first tool body is substantially collinear with the second tool axis of the second tool body.

Example 4: The pulsed electrochemical machining system of example 1 or 2, wherein the first tool axis of the first tool body is disposed at an angle between about 30 degrees and about 60 degrees from the second tool axis of the second tool body.

Example 5: The pulsed electrochemical machining system of any of examples 1-4, wherein the mechanical system is configured to oscillate at least one of the first tool body or the second tool body relative to the workpiece.

Example 6: The pulsed electrochemical machining system of example 5, wherein a pulse of DC current is delivered to the at least one of the first tool body or the second tool body when the at least one of the first tool body or the second tool body reaches its closest approach, and the at least one of the first tool body or the second tool body does not receive a pulse of DC current when the at least one of the first tool body or the second tool body reaches its most distant point from the workpiece.

Example 7: The pulsed electrochemical machining system of any of examples 1-5, wherein the first tool body is configured to oscillate between a first closest approach and a first most distant point from the workpiece, wherein the second tool body is configured to oscillate between a second closest approach and a second most distant point from the workpiece, and wherein the first tool body and the second tool body are synchronized together such that the first tool body and the second tool body reach their respective closest approaches at substantially the same time.

Example 8: The pulsed electrochemical machining system of example 5, wherein both the first tool body and the second tool body are configured to oscillate between respective closest approaches and respective most distant points from the workpiece, and wherein the first tool body and the second tool body are configured such that the first tool body reaches its respective closest approach at substantially the same time the second tool body reaches its respective most distant point from the workpiece.

Example 9: The pulsed electrochemical machining system of any of examples 1-8, further comprising the workpiece, wherein the workpiece is a coversheet or spar formed of a nickel superalloy.

Example 10: The pulsed electrochemical machining system of any of examples 1-9, wherein the mechanical system comprises at least one mechanical support for the workpiece.

Example 11: The pulsed electrochemical machining system of example 10, wherein the mechanical support engages the workpiece at two or fewer points of contact.

Example 12: The pulsed electrochemical machining system of any of examples 1-11, wherein the first tool body and the second tool body are spaced apart in a direction substantially parallel to a gravitational force.

Example 13: The pulsed electrochemical machining system of any of examples 1-13, wherein the first tool body and the second tool body are spaced apart in a direction substantially perpendicular to a gravitational force.

Example 14: A method for pulsed electrochemical machining a workpiece includes delivering electrolyte through an electrolyte system into a first interelectrode gap between a first working surface and a first target surface of the workpiece, and into a second interelectrode gap between a second working surface and a second target surface of the workpiece, wherein the first working surface is defined by a first electrode of a first tool body, wherein the second working surface is defined by a second electrode of a second tool body; generating pulsed direct current between the first electrode and the workpiece, and between the second electrode and the workpiece.

Example 15: The method for pulsed electrochemical machining a workpiece of example 14, further comprising positioning the first tool axis of the first tool body such that it is substantially parallel to the second tool axis of the second tool body.

Example 16: The method for pulsed electrochemical machining a workpiece of example 14 or 15, further comprising positioning the first tool axis of the first tool body such that it is substantially collinear with the second tool axis of the second tool body.

Example 17: The method for pulsed electrochemical machining a workpiece of example 14 or 15, wherein the first tool axis of the first tool body is disposed at an angle between about 30 degrees and about 60 degrees from the second tool axis of the second tool body.

Example 18: The method for pulsed electrochemical machining a workpiece of any of examples 15-17, further comprising oscillating at least one of the first tool body or the second tool body relative to the workpiece using a mechanical system.

Example 19: The method for pulsed electrochemical machining a workpiece of example 18, wherein the pulsed direct current is delivered to the at least one of the first tool body or the second tool body when the at least one of the first tool body or the second tool body reaches its closest approach, and the pulsed direct current is not delivered to the at least one of the first tool body or the second tool body reaches its most distant point from the workpiece.

Example 20: The method for pulsed electrochemical machining a workpiece of any of examples 14-18, further includes oscillating the first tool body between a first closest approach and a first most distant point from the workpiece, oscillating the second tool body between a second closest approach and a second most distant point from the workpiece, and coordinating oscillations of the first tool body and the second tool body such that the first tool body and the second tool body reach their respective closest approaches at substantially the same time.

Example 21: The method for pulsed electrochemical machining a workpiece of any of examples 14-18, further includes oscillating the first tool body between a first closest approach and a first most distant point from the workpiece, oscillating the second tool body between a second closest approach and a second most distant point from the workpiece, and coordinating oscillations of the first tool body and the second tool body such that the first tool body reaches its respective closest approach at substantially the same time the second tool body reaches its respective most distant point from the workpiece.

Example 22: The method for pulsed electrochemical machining a workpiece of any of examples 14-21, wherein the workpiece is a coversheet or spar formed of a nickel superalloy.

Example 23: The method for pulsed electrochemical machining a workpiece of any of examples 14-22, further comprising mechanically supporting the workpiece with at least one mechanical support.

Example 24: The method for pulsed electrochemical machining a workpiece of example 23, wherein mechanically supporting the workpiece comprises engaging the workpiece at two or fewer points of contact.

Example 25: The method for pulsed electrochemical machining a workpiece of any of examples 14-24, further comprising spacing apart the first tool body and the second tool body in a direction substantially parallel to a gravitational force.

Example 26: The method for pulsed electrochemical machining a workpiece of any of examples 14-24, further comprising spacing apart the first tool body and the second tool body in a direction substantially perpendicular to a gravitational force.

The invention claimed is:

1. A pulsed electrochemical machining system, comprising:
    a first tool body defining a first tool axis, the first tool body comprising a first electrode defining a first working surface configured to face a workpiece;
    a second tool body defining a second tool axis, the second tool body comprising a second electrode defining a second working surface configured to face the workpiece;
    a mechanical system configured to:
        position the first working surface of the first tool body relative to the workpiece and configured to position the second working surface of the second tool body relative to the workpiece;
        oscillate the first tool body relative to the workpiece between a closest approach and a most distant point from the workpiece while the second tool body is stationary, and
        oscillate the second tool body relative to the workpiece between a closest approach and a most distant point from the workpiece while the first tool body is stationary;
        wherein the first tool body and the second tool body are configured to oscillate at different frequencies;
    an electrolyte system configured to supply electrolyte to:
        a first interelectrode gap between the first working surface of the first tool body and a first target surface of the workpiece;
        a second interelectrode gap between the second working surface of the second tool body and a second target surface of the workpiece; and
    a power supply configured to generate a pulsed direct current between the first tool body and the workpiece and the second tool body and the workpiece.

2. The pulsed electrochemical machining system of claim 1, wherein the first tool axis of the first tool body is substantially parallel to the second tool axis of the second tool body.

3. The pulsed electrochemical machining system of claim 1, wherein the first tool axis of the first tool body is substantially collinear with the second tool axis of the second tool body.

4. The pulsed electrochemical machining system of claim 1, wherein the first tool axis of the first tool body is disposed at an angle between about 30 degrees and about 60 degrees from the second tool axis of the second tool body.

5. The pulsed electrochemical machining system of claim 1, wherein a pulse of DC current is delivered to the at least one of the first tool body or the second tool body when the at least one of the first tool body or the second tool body reaches its closest approach, and the at least one of the first tool body or the second tool body does not receive a pulse of DC current when the at least one of the first tool body or the second tool body reaches its most distant point from the workpiece.

6. The pulsed electrochemical machining system of claim 1, further comprising the workpiece, wherein the workpiece is a coversheet or spar formed of a nickel superalloy.

7. The pulsed electrochemical machining system of claim 1, wherein the mechanical system comprises at least one mechanical support for the workpiece.

8. The pulsed electrochemical machining system of claim 7, wherein the mechanical support engages the workpiece at two or fewer points of contact.

9. A method for pulsed electrochemical machining a workpiece, comprising:
- delivering electrolyte through an electrolyte system into a first interelectrode gap between a first working surface and a first target surface of the workpiece, and into a second interelectrode gap between a second working surface and a second target surface of the workpiece, wherein the first working surface is defined by a first electrode of a first tool body, wherein the second working surface is defined by a second electrode of a second tool body;
- generating pulsed direct current between the first electrode and the workpiece, and between the second electrode and the workpiece,
- oscillating the first tool body relative to the workpiece between a closest approach and a most distant point from the workpiece while the second tool body is stationary, and
- oscillating the second tool body relative to the workpiece between a closest approach and a most distant point from the workpiece while the first tool body is stationary;
- wherein oscillating the first tool body comprises oscillating the first tool body at a first frequency, and
- wherein oscillating the second tool body comprises oscillating the second tool body at a second frequency, wherein the first frequency is different than the second frequency.

10. The method for pulsed electrochemical machining a workpiece of claim 9, further comprising positioning a first tool axis of the first tool body such that it is substantially parallel to a second tool axis of the second tool body.

11. The method for pulsed electrochemical machining a workpiece of claim 9, further comprising positioning a first tool axis of the first tool body such that it is substantially collinear with a second tool axis of the second tool body.

12. The method for pulsed electrochemical machining a workpiece of claim 9, wherein a first tool axis of the first tool body is disposed at an angle between about 30 degrees and about 60 degrees from a second tool axis of the second tool body.

13. The method for pulsed electrochemical machining a workpiece of claim 9, wherein the workpiece is a coversheet or spar formed of a nickel superalloy.

14. The pulsed electrochemical machining system of claim 1, wherein the second tool body is configured to oscillate at a harmonic frequency of the first tool body.

15. The method for pulsed electrochemical machining a workpiece of claim 9, wherein the second frequency is a harmonic frequency of the first frequency.

* * * * *